UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CONCRETE FLOORING AND COMPOSITION THEREFOR.

1,246,827.  Specification of Letters Patent.  Patented Nov. 13, 1917.

No Drawing.  Application filed April 26, 1917.  Serial No. 164,630.

*To all whom it may concern:*

Be it known that I, CARLETON ELLIS, a citizen of the United States, and a resident of Montclair, in the county of Essex and State of New Jersey, have invented certain new and useful Improvements in Concrete Flooring and Composition Therefor, of which the following is a specification.

This invention relates to concrete floors and to a coating composition suitable for treating concrete floors or floors containing lime or other alkali material which affect ordinary saponifiable finishes and paints made with linseed oil, acid resins, saponifiable resins and the like and the invention relates particularly to the use of cumaron resin, or para cumaron, which is a substance usually made by the polymerization of certain constituents of solvent naphtha, principally cumaron and indene, forming a resinous body apparently largely of a hydrocarbon character and substantially unaffected by cement alkali.

According to the present invention cumaron resin or para cumaron is placed in solution preferably without adding any saponifiable oil such as linseed or Chinese wood oil or any substances of that character (although such additions are not precluded) and this solution is applied to the concrete floor either by spraying or brushing to produce a suitable coating or filling of the unsaponifiable resin.

A suitable solution for this purpose may be made by dissolving approximately equal parts of cumaron resin of melting point of say 62° C. in heavy benzin, painters' naphtha, texene, turpalin, or other turpentine substitute. The solution, if cloudy, may be filtered so as to produce a clear transparent product free from any undesirable insoluble bodies which are not infrequently present. If the amount of such residue is large the solution may be filtered and then filter pressed or if allowed to stand for a considerable period the clear liquid may be drawn from the top leaving the insoluble product of over-polymerization beneath as a sludge. These products of over-polymerization, etc., are often fairly soluble in benzol and solutions may be obtained therewith, or in some cases by using a mixture of hydrocarbons of the paraffin series such as the heavy benzin mentioned, along with 10 to 25% of benzol, toluol or other similar solvent of the aromatic series. Thus the over-polymerized or other bodies insoluble in the petroleum hydrocarbon are put into solution and a film of this dries to a clear transparent finish.

Preferably somewhat more than 50% of cumaron resin by weight is used in such a composition as thereby a body is secured which does not penetrate too deeply into the concrete floor but gives a suitable surface which is not so excessively hard as to be dangerous from being slippery as would be the case with wax and certain hard resin finishes. Pigments may be added when desired.

In preparing a composition of this character I preferably employ a cumaron resin which is not too hard and thus avoid securing a slippery surface. While I do not wish to be limited in this respect I may state that cumaron resin melting between 55° C.–75° C. may be used with satisfactory results. The coating prepared with these softer resins dries with a slight tackiness which usually never entirely disappears, especially if drying agents such as lead oleate or resinate are not present. This persistent but slight tackiness is advantageous in securing the proper foothold or grip on the floor so that the composition may be used on concrete stairways and the like with satisfactory results.

One feature of my invention involves the use of cumaron resin having this slightly tacky quality but not sufficiently tacky to attract and retain dust and dirt in any objectionable manner. Ordinarily varnishes drying to leave a slightly tacky surface are considered bad and I believe I am the first to ascertain the utility of cumaron resin, especially the sorts having permanently tacky properties, in this direction.

A further feature of my invention is the use of a solution of cumaron resin free from objectionable amounts of products of over-polymerization or insoluble impurities of an undesirable character so as to produce a desirable finish coating on concrete.

As stated, various departures may be made, such as the use of harder or softer resin, additions of other unsaponifiable or saponifiable resins, drying or non-drying oils, driers, pigments, fillers, abrasives, frictional foothold material such as carborundum, alundum powder, etc., which is a useful addition for the treads of stairs of concrete, 5 to 10% of 20-25 mesh carborundum being recommended. Tacky qualities may be obtained from the harder resins by addition of vaseline or non-drying mineral or other oil, or even by use of semi-drying oils in some cases. 5 to 10% of vaseline may be added to a cumaron resin too hard to give a satisfactory non-slippery foot-grip.

My invention also comprises a structural mass or aggregate consisting of a non-dusting concrete floor, the upper surface of which is coated and more or less impregnated with a film of cumaron resin. Preferably the floor is left somewhat rough so that the cumaron resin may have the proper anchorage. The concrete may be sufficiently porous so that the cumaron resin penetrates to a short distance. The proportion of the solvent may be varied to adjust the viscosity to give the requisite penetration. Too thin a solution will not give the proper coating or surfacing effect. In this way a waterproof coating quite resistant to alkali, consisting preferably substantially or entirely of an unsaponifiable resinous body is secured, preferably being prepared with the aid of a very slightly tacky form of cumaron resin to secure the preferred form of the present invention. The cement or concrete floor is preferably made without the smooth finish customarily employed but is as stated left with a very slightly rougher surface which enables the cumaron resin to adhere without the aid or employment of any drying oil or other similar agent, although the use of such oily material is not precluded when desired. While ordinarily only the upper surface of the concrete or cement mass is treated with the cumaron resin composition there is no restriction against the application of cumaron resin to other surfaces of the concrete mass if such coating is desired elsewhere than on the upper or wearing surface thereof. The composition may be applied to sidewalks in a similar manner.

A dark colored cumaron resin melting at 52–53° C. may be used for this purpose, or for use with dark shades of pigments. A light colored resin melting at 57–58° C. may be used with white or gray colors. A dark resin melting at 60–62° is good for surfaces exposed to hard wear, etc.

In my copending application Serial No. 194,314 filed Oct. 2, 1917, I have described the application of cumaron resin to concrete floors or tread surfaces of a roughened character, such as may be obtained by troweling the fresh concrete surface with a wooden trowel, and have also described the use of cumaron resin of relatively high melting point in connection with the coating of concrete bodies and such subject matter is not claimed herein.

What I claim is:

1. The process of treating concrete floors which consists in applying thereto a coating comprising cumaron resin substantially free from saponifiable bodies, said cumaron resin being capable of drying from solution to form a slightly tacky surface capable of giving a good foot-grip but not absorbing objectionable amounts of dust.

2. The process of treating concrete floors which consists in applying thereto a coating comprising cumaron resin substantially free from saponifiable bodies, said cumaron resin being capable of drying from solution to form a slightly tacky surface capable of giving a good foot-grip.

3. The process of treating concrete bodies which consists in applying thereto a coating comprising slightly tacky cumaron resin substantially free from saponifiable bodies.

4. The process of treating concrete floors which consists in applying thereto a coating comprising slightly tacky cumaron resin.

5. The process of treating concrete floors which comprises applying thereto a slightly tacky unsaponifiable resin capable of giving a foothold or foot-grip but not sufficiently tacky to absorb and retain objectionable amounts of dirt and dust.

6. The process of treating concrete floors which comprises applying thereto a slightly tacky unsaponifiable resin capable of giving a foothold or foot-grip.

7. The process of treating concrete floors which comprises applying thereto a slightly tacky unsaponifiable resin.

8. The process of treating concrete floors which comprises applying thereto a composition containing an unsaponifiable resin, said composition drying to a permanently slightly tacky surface.

9. A composition for coating concrete which consists of cumaron resin dissolved in a hydrocarbon solvent, said cumaron resin having a melting point of about 62° C. and being capable of drying from solution to form a permanently slightly tacky floor finish not collecting objectionable quantities of dust.

10. A composition for coating concrete floors which consists of cumaron resin dissolved in a hydrocarbon solvent, said cumaron resin having a melting point of above 55° C. and being capable of drying from solution to form a permanently slightly tacky floor finish.

11. A composition for coating concrete floors which consists of cumaron resin dissolved in a hydrocarbon solvent, said cumaron resin having a melting point of between 50–75° C. and being capable of drying from solution to form a permanently slightly tacky floor finish.

12. A composition for coating concrete floors which consists of cumaron resin dissolved in a hydrocarbon solvent, said cumaron resin having a melting point of about 55–75° C.

13. A composition for coating concrete comprising slightly tacky cumaron resin and a solvent therefor.

14. A composition for coating concrete floors comprising cumaron resin substantially free from saponifiable or acid bodies dissolved in a solvent comprising heavy benzin and an aromatic solvent comprising benzol, said composition drying to a clear but slightly tacky film.

15. A composition for coating concrete comprising cumaron resin of a melting point of about 55–75° C. dissolved in approximately an equal part of heavy benzin, said resin being capable of drying on a concrete floor to produce a very slightly tacky surface of substantially permanent quality capable of furnishing an adequate grip or foothold.

16. A composition for coating concrete comprising cumaron resin of a melting point of about 62° C. dissolved in approximately an equal part of heavy benzin and free from insoluble products of over-polymerization, said resin being capable of drying on a concrete floor to produce a very slightly tacky surface of substantially permanent quality capable of furnishing an adequate grip or foothold.

17. A composition for coating concrete comprising cumaron resin of a melting point of at least 55° C. dissolved in approximately an equal part of heavy benzin, said resin being capable of drying on a concrete floor to produce a very slightly tacky surface of substantially permanent quality capable of furnishing an adequate grip or foothold.

18. A concrete floor consisting of a concrete aggregate, the upper surface of which is coated with a slightly tacky resinous coating comprising cumaron resin.

19. A concrete treading surface consisting of a concrete aggregate, coated with slightly tacky cumaron resin.

20. A floor of an alkaline nature consisting of an aggregate, the wearing surface of which is coated with an alkali-resistant slightly tacky coating containing substantial and influential quantities of an unsaponifiable resin.

21. A concrete or cement floor consisting of a concrete aggregate, the upper surface of which is coated with slightly tacky coating giving a foot-grip, and comprising cumaron resin.

CARLETON ELLIS.